United States Patent [19]

Lowrance et al.

[11] Patent Number: 4,473,180

[45] Date of Patent: Sep. 25, 1984

[54] AUTOMATIC FEEDING APPARATUS

[75] Inventors: Thomas F. Lowrance, 3601 Security St., Garland, Tex. 75040; James B. Sharp, Edgewood, Tex.

[73] Assignee: Thomas F. Lowrance, Garland, Tex.

[21] Appl. No.: 410,973

[22] Filed: Aug. 24, 1982

[51] Int. Cl.³ .............................................. B27F 7/00
[52] U.S. Cl. ..................................... 227/48; 221/204; 227/116; 227/119; 227/152
[58] Field of Search ............... 198/479, 653, 694, 695, 198/696; 221/93, 204, 272–275, 201, 200, 202; 227/24, 30, 39, 40, 43, 48, 99, 100, 103, 104, 105, 114, 115, 116, 117, 119, 141, 152; 294/87 R, 103 R

[56] References Cited

U.S. PATENT DOCUMENTS

| | | | |
|---|---|---|---|
| 1,400,002 | 12/1921 | Roger | 227/105 X |
| 1,678,355 | 7/1928 | Roberts | 221/204 |
| 2,925,932 | 2/1960 | Evanson | 227/116 X |
| 3,162,322 | 12/1964 | Gilbertson | 221/202 X |
| 3,305,128 | 2/1967 | Dearsley | 221/201 X |
| 3,691,608 | 9/1972 | Lowrance | 227/48 X |
| 3,758,014 | 9/1973 | Herr | 227/116 X |
| 4,069,960 | 1/1978 | Lowrance | 227/120 |

FOREIGN PATENT DOCUMENTS

| | | | |
|---|---|---|---|
| 476143 | 5/1929 | Fed. Rep. of Germany | 221/200 |
| 105646 | 8/1963 | Netherlands | 221/93 |

Primary Examiner—Paul A. Bell
Attorney, Agent, or Firm—Peter J. Murphy

[57] ABSTRACT

A stick hopper box has a floor and dividers mounted on the floor defining vertical guide channels for stacks of single rows of wieners. A plunger assembly includes individual plungers for expelling the lowermost wiener from the several guide channels into aligned clamps of a wiener clamping mechanism. A stick hopper for round sticks includes a box and transversely spaced dividers defining vertical guide channels for stacks of single sticks, the stick hopper guide channels being aligned with the wiener hopper guide channels and wiener clamps. A push rod mechanism, including individual push rods for each stick hopper guide channel, expels the sticks from the channel and inserts the sticks into wieners clamped in the wiener clamping mechanism. A conveyor of transport devices may move in a transverse path between the stick hopper and the wiener clamping mechanism, engaging the projecting sticks of the assembled wieners and sticks, and transporting the assembled wieners and sticks away from the apparatus as released by the clamping mechanism. A stick feeding mechanism feeds sticks directly from a shipping carton into the stick hopper.

26 Claims, 18 Drawing Figures

AUTOMATIC FEEDING APPARATUS

BACKGROUND AND SUMMARY OF THE INVENTION

This invention relates to automatic apparatus for feeding and for assemblying components of articles; and more particularly to apparatus for feeding and for assemblying wieners and holder sticks in the processing of a corn dog product.

This invention is particularly concerned with the manufacture of or processing of a food product known as a "corn dog"; which product is made from a wiener having a holder stick inserted into one end, which is coated with a cornmeal batter, for example, and which is cooked by means of frying in deep fat for example.

A principal object of this invention is to provide improved apparatus for the automatic feeding of and assembly of wieners and holder sticks for use in an automatic machine for the complete processing of corn dogs, including batter coating and frying.

Another object of this invention is to provide such apparatus to enable the rapid processing of a large number of corn dogs.

A further object of this invention is to provide such apparatus which is reliable and durable, and subject to minimum down time for adjustments or for correcting malfunctions.

Still another object is to provide such apparatus which is efficient and easy to use.

A still further object of this invention is to provide such apparatus for the automatic feeding of wieners to a clamping mechanism, and for the automatic clamping of the wieners to enable the insertion thereof of holder sticks.

Still another object of this invention is to provide such apparatus including means for the automatic clamping of wieners to enable the insertion therein of holder sticks, and for holding the assembled wieners and holder sticks for subsequent pickup by suitable transport apparatus of an automatic machine.

A further object of this invention is to provide such apparatus for the automatic insertion of holder sticks from a stick hopper into suitably secured wieners; and to provide for the automatic feeding of holder sticks into the stick hopper from a shipping carton in which such sticks are supplied.

Apparatus for accomplishing these objects includes the following components. A wiener hopper for containing a quantity of wieners includes a floor and a plurality of transversely spaced dividers defining guide channels for vertical stacks of single wieners. A plunger assembly including a plunger aligned with each guide channel is reciprocable to expel the lowermost wiener from each hopper guide channel. A clamping assembly has a plurality of left and right clamp halves, selectively opened and closed, defining clamping chambers for receiving wieners expelled from the wiener hopper. A stick hopper for containing a plurality of sticks includes a base panel and a plurality of transversely spaced dividers defining guide channels for single vertical rows of sticks. A push rod assembly includes a plurality of push rods, aligned with the wiener clamping chambers, for expelling the lowermost stick from each stick hopper guide channel and inserting those sticks partially into the several wieners in the wiener clamping chambers. More particularly, a stick feeding mechanism, associated with the stick hopper, feeds a single generally horizontal row of sticks from a supply box into the stick hopper.

The novel features and the advantages of the invention, as well as additional objects thereof, will be understood more fully from the following description when read in connection with the accompanying drawings.

DESCRIPTION OF THE PREFERRED EMBODIMENT

Figure 1:
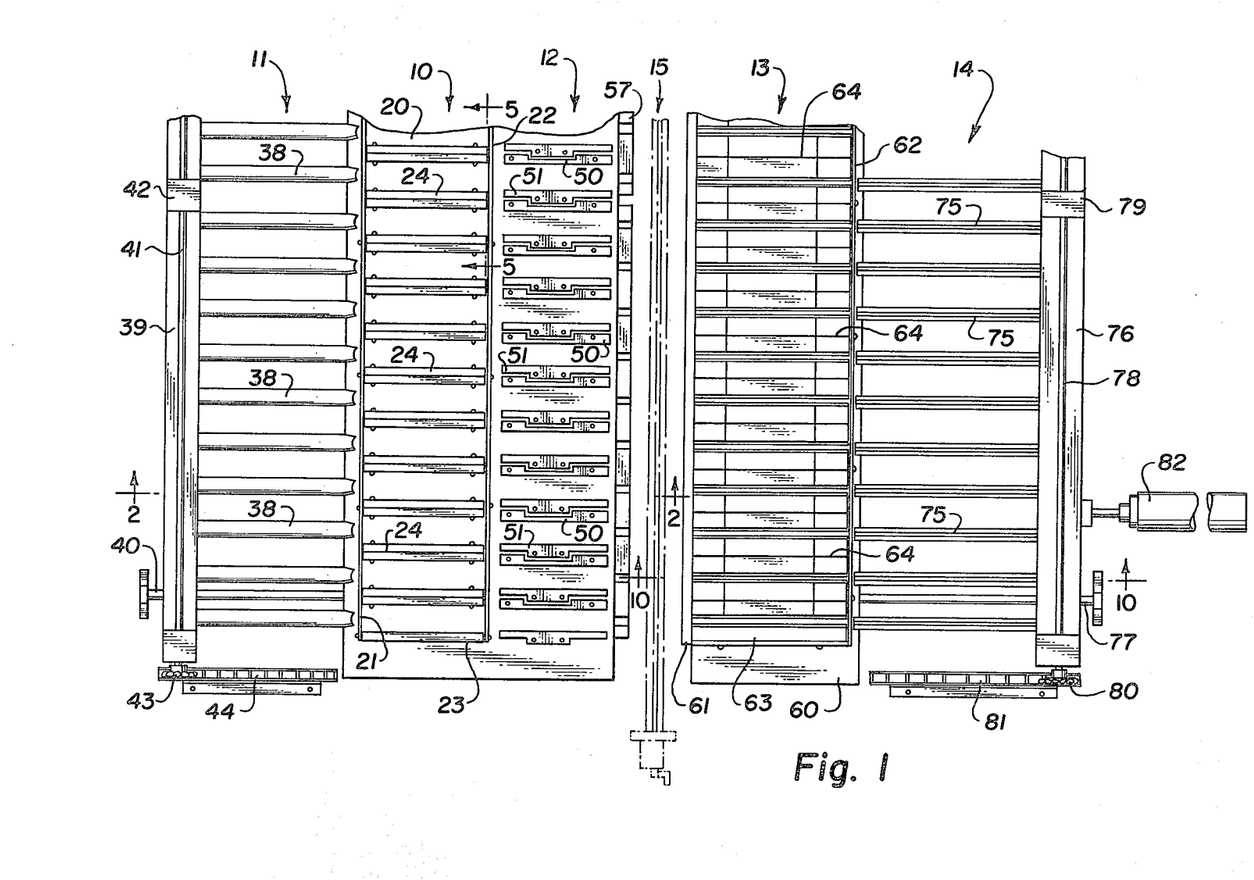
FIG. 1 is a plan view of apparatus according to the invention including a wiener hopper and associated ejecting mechanism, a wiener clamping assembly, a stick hopper and associated ejecting mechanism, and a transport device (in phantom) for transporting assembled articles from the apparatus.

The drawings illustrate feeding apparatus which may be a part of an overall automatic machine for processing corn dogs including the automatic feeding of wieners and wiener sticks, the assembly of the wiener sticks with the wieners, the transport of the assembled wieners and sticks to a coating station wherein the wieners are coated with a cornmeal batter for example, transport of the wieners and sticks to a cooking vat, and the discharge of the cooked corn dogs from the machine to a suitable receptacle. FIG. 1 is a partial plan view of the feeding and assembling apparatus of such a machine including a wiener hopper, a stick hopper, and mechanisms associated with these hoppers for assembling the sticks into the wieners. The assembled wieners and sticks are then in position to be picked up by a suitable transport mechanism for transport to stations for further processing. For convenience in describing the relative positions of the several subassemblies and components, the left end of the apparatus illustrated in FIG. 1 is referred to as the front of the apparatus or machine; and forward and rearward parts and movements will be in relation to this front of the apparatus. The apparatus of FIG. 1 is supported in a generally horizontal plane relative to a floor surface on a suitable frame, which frame is not illustrated in the drawings.

Referring particularly to FIG. 1, the several principal subassemblies of the apparatus are a wiener hopper 10, a plunger mechanism 11, a wiener clamping mechanism 12, a stick hopper 13, and a stick inserting mechanism 14.

A stick holder 15, for transporting the assembled wieners and sticks is illustrated in phantom in FIG. 1, and is not described in detail in this application. In a suitable machine with which the apparatus of the invention is used, the stick holder 15 would consist of elongated mechanisms movable on a conveyor chain through the plane of the drawing of FIG. 1; and when positioned generally in the plane of the apparatus of FIG. 1, would be actuated to clamp the sticks of the assembled wieners and sticks and then carry the assembled wieners and sticks away from the apparatus of the invention.

Reference may be had to U.S. Pat. No. 3,316,010 issued Apr. 25, 1967 and U.S. Pat. No. 3,691,608 issued Sept. 19, 1972, Fig. 10 thereof, for examples of the types of stick holders which might be adapted for use with the apparatus of this invention.

Figure 2:
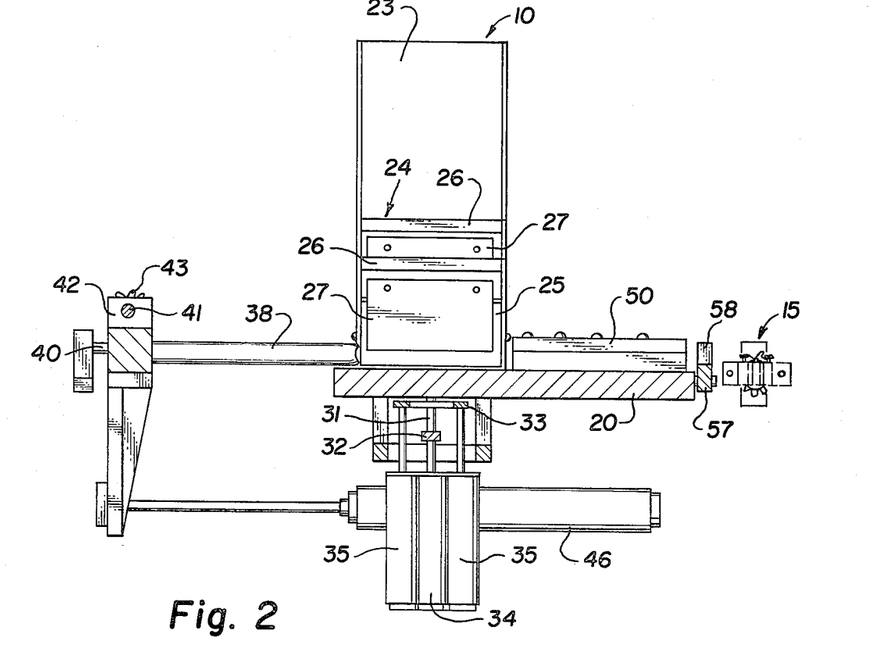
FIG. 2 is a longitudinal vertical sectional view of the wiener hopper and associated ejection mechanism and the wiener clamping mechanism, taken along the line 2—2 of FIG. 1, with the ejecting plungers withdrawn from the hopper.
Figure 3:
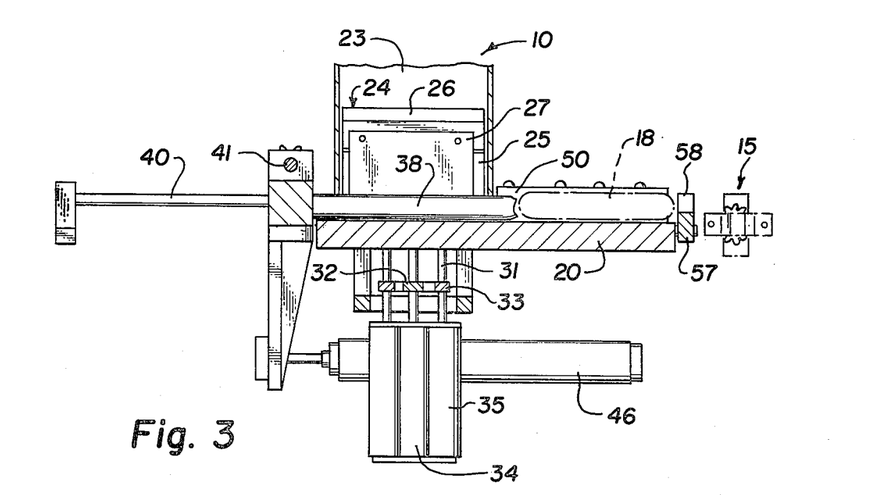
FIG. 3 is a view similar to FIG. 2 with the ejection plungers in the ejection position.

Referring particularly to FIGS. 1, 2 and 3 the wiener hopper 10 and the wiener clamping mechanism 12 are mounted on a common support base referred to as a wiener board 20. The wiener hopper is a transversely elongated box including the wiener board at its base, having forward and rearward walls 21 and 22 and having end walls 23. These walls may be fabricated from transparent plastic material to enable ready viewing of the supply of wieners within the wiener hopper. Within the box are a plurality of transversely spaced dividers 24 consisting of base blocks 25 mounted on the wiener board and agitators 26, best seen in FIG. 5. The dividers 24 form vertical partitions which define intervening wiener channels for confining a stack of wieners 18 shown in phantom in FIG. 5. The agitators 26 are reciprocated vertically, as will be described, to agitate the wieners within the hopper box and assure their moving downward within the wiener channels, and positioning the lowermost wiener within the respective channels to be ejected from the hopper as will be described. Skirts 27, fabricated from a suitable material, are secured to the agitators 26 and extend downward to overlie at least partially the blocks 25 for all positions of the agitators. In order to adapt the apparatus to accommodate smaller size wieners, spacers 28 may be mounted on the sides of the base blocks 25, as extension of the blocks underlying the skirts 27.

Figure 5:
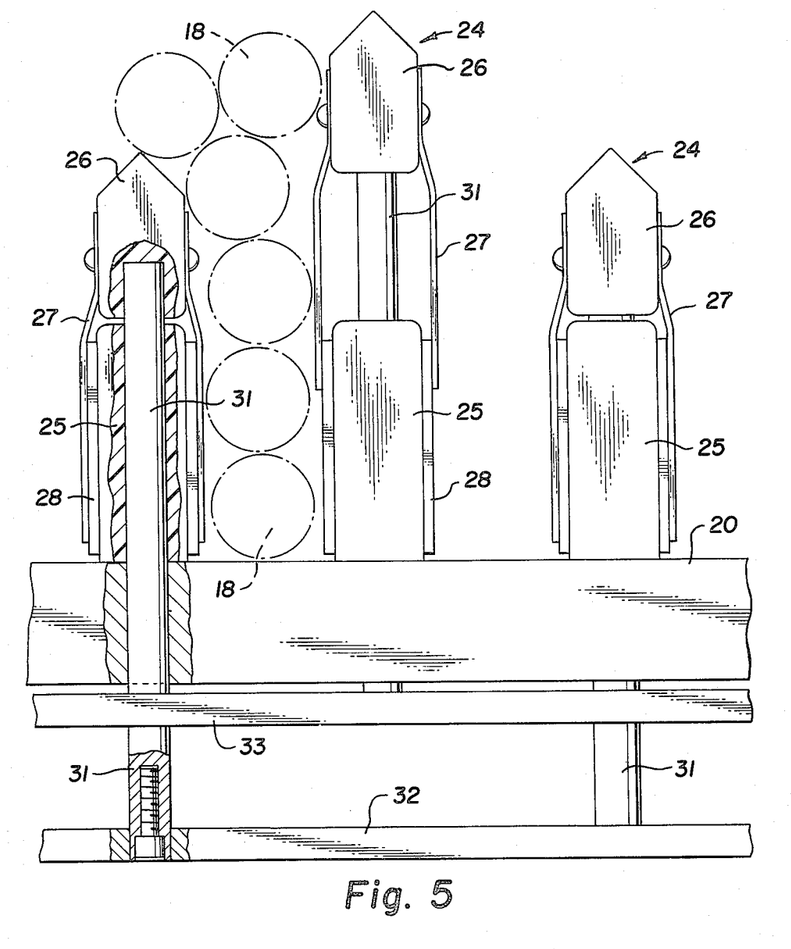
FIG. 5 is a fragmentary elevation view taken along the line 5—5 of FIG. 1.

The agitators 26 are mounted on lifter rods 31 which extend downwardly from the agitators, through the base blocks and the wiener board 20. The push rods, in turn, are mounted on two separate transverse support bars 32 and 33, with one set of push rods for alternate agitators being mounted on the support bar 32, and another set of push rods for the intervening agitators being mounted on the support bar 33. The support bars 32 and 33 are reciprocated vertically by respective air cylinders 34 and 35 which are controlled by a suitable timing valve mechanism to lift the alternate groups of agitators in sequence. This wiener hopper mechanism assures a constant feed of wieners downward through the wiener guide channels, so that the lowermost wieners in the channels are positioned to be ejected from the hopper. The wiener hopper 10 may include any desired number of wiener channels, such as twenty.

Figure 4:
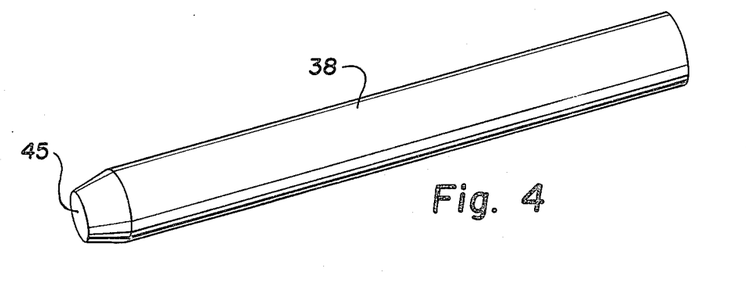
FIG. 4 is a perspective view of a wiener plunger of the injection mechanism.

The plunger mechanism 11 includes a plurality of transversely spaced plungers 38 mounted on an elongated push bar 39. The push bar is mounted for reciprocating movement toward and away from the wiener hopper 10 to push the plungers through the wiener hopper to eject the lowermost wiener in the respective wiener channels from the hopper and into the respective clamps of the wiener clamping mechanism 12. The push bar is guided in its reciprocating movement on a pair of guide rods 40 secured to the frame of the apparatus. The push bar carries a stabilizer mechanism including a stabilizer shaft parallel to and generally coextensive with the push bar, rotatably supported in bearing blocks 42. Sprockets 43 nonrotatably mounted at the oppsite ends of the stabilizer shaft 41 ride in respective sprocket guides 44 suitably mounted on the apparatus frame to assure uniform reciprocation of the several plungers carried on the push bar. As best seen in FIG. 4, the leading end of a plunger 38, which is the rearward end in the assembly, is provided with a concave recess 45 to assist in seating on the rounded wiener end and expelling the wiener from the wiener hopper. The push bar is reciprocated by one or more air cylinders 46 under suitable control.

Figure 6:
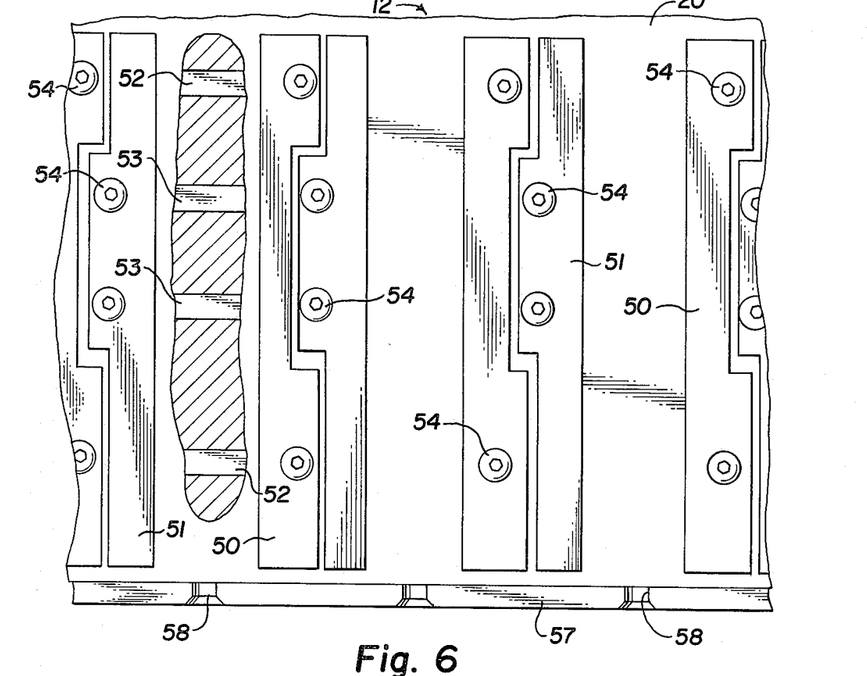
FIG. 6 is a fragmentary plan view of the wiener clamping assembly, partially broken away.
Figure 7:
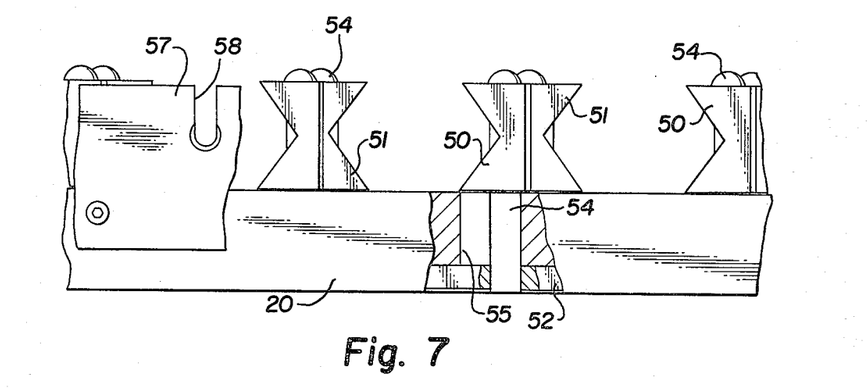
FIG. 7 is a fragmentary rear elevation view of the wiener clamping assembly, showing the clamps in open condition.
Figure 8:
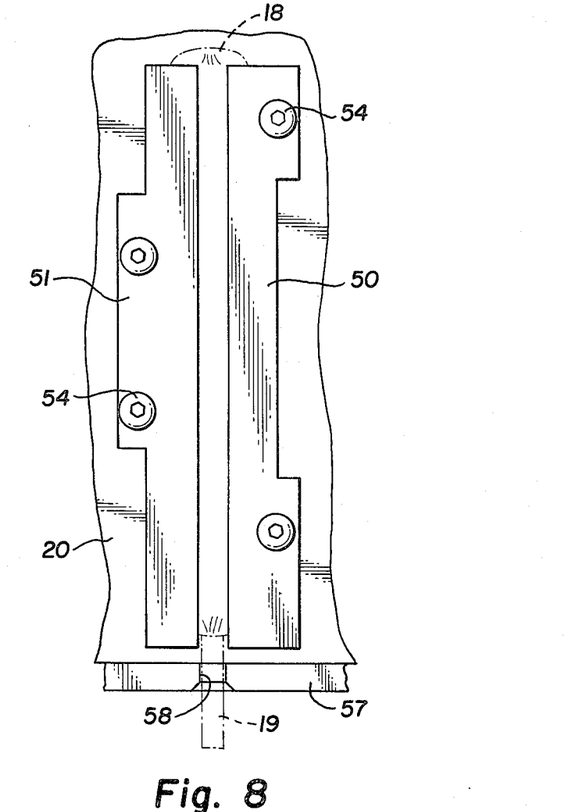
FIG. 8 is a fragmentary plan view of the wiener clamping assembly, showing the clamps closed and enclosing a wiener.
Figure 9:
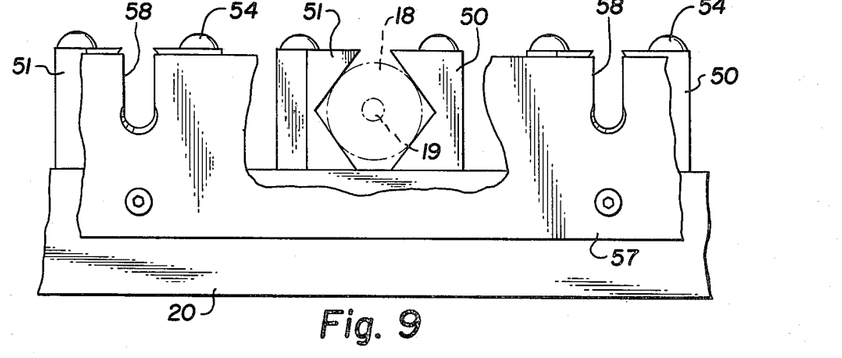
FIG. 9 is a fragmentary elevation view, based on FIG. 8, showing a wiener clamp in the closed condition.

The wiener clamping mechanism 12 includes a plurality of transversely spaced wiener clamps slidably mounted on the wiener board 20, each clamp providing a clamping chamber aligned longitudinally with a respective wiener channel of the wiener hopper. Each clamp consists of a left clamp half 50 and a right clamp half 51. As best seen in FIG. 7, the confronting faces of the clamp halves form concave V-shaped longitudinal grooves, with the apexes of the grooves defining the horizontal plane of the center of the clamping chambers which is spaced above the surface of the wiener board 20. The clamping halves are designed so that when a wiener is clamped, as shown in FIG. 8, the wiener will be lifted from the wiener board and centered in the clamping chamber. The left and right clamp halves are mounted for transverse reciprocating movement on respective pairs of motion bars 52 and 53. These motion bars are confined for transverse reciprocation in grooves provided in the under face of the wiener board 20. Each of the clamp halves is mounted on its respective motion bar by a pair of pins 54 which extend downward through associated laterally elongated slots 55 in the wiener board and into respective recesses in the motion bars. The pins and recesses are dimensioned for a snug fit and to permit the clamp halves to be readily removed by lifting from the wiener board surface for cleaning and other service. As best seen in FIG. 6, the motion bars 53 for the right clamp halves are adjacent to each other, and the motion bars 52 for the left clamp halves 50 are outside of the motion bars 53. The motion bars 53 are connected to each other by a suitable yoke at one side of the mechanism, and the motion bars 52 are connected to each other by a suitable yoke at the opposite side of the mechanism. Separate air cylinders 56 are connected to each of these yokes and these are controlled through a common control. When it is desired to close the clamp halves to the closed condition, illustrated in FIGS. 8 and 9, the left clamp halves 50 are shifted to the right and the right clamp halves 51 are simultaneously shifted to the left to clamp the wieners and simultaneously center the wieners within the clamps. The clamping mechanism 12 includes a wiener stop 57 in the form of a barrier wall secured to the rearward edge of the wiener board 20. This barrier wall has an elevation approaching the upper level of the clamp halves and is provided with guide apertures 58 as seen in FIGS. 6 and 8. These guide apertures are aligned with the centers of the clamping chambers and of the wieners confined therein, and serve to guide the corn dog sticks 19 into the wieners as will be described. As seen, the guide apertures are partially bevelled to assist the guiding function.

Figure 10:
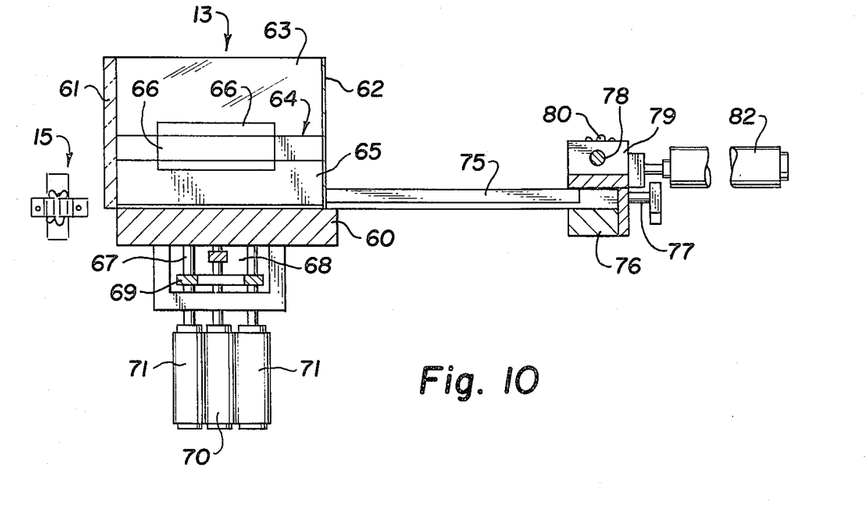
FIG. 10 is a longitudinal vertical sectional view taken along the line 10—10 of FIG. 1, showing the stick hopper and associated ejection mechanism with the ejection push rods withdrawn.
Figure 12:
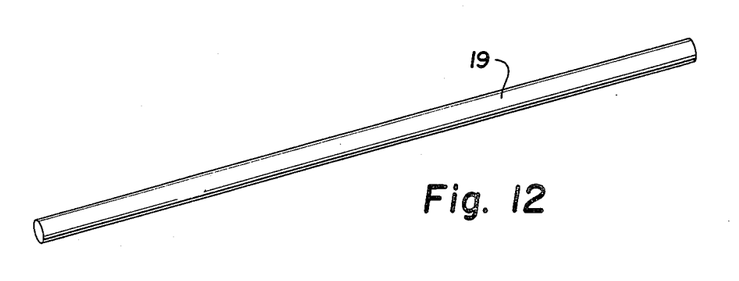
FIG. 12 is a perspective view of a stick.
Figure 13:
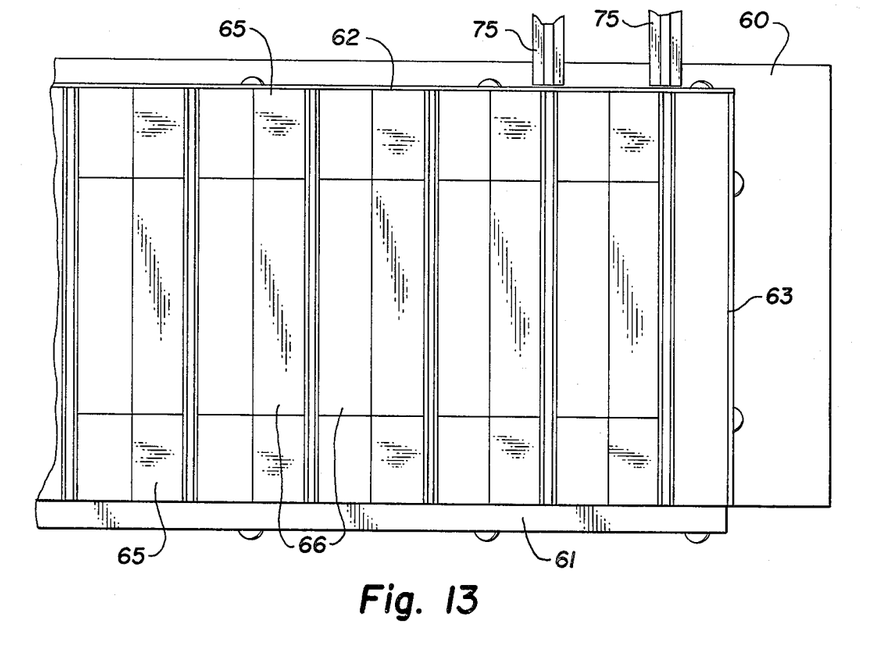
FIG. 13 is a fragmentary plan view of the stick hopper.

The stick hopper 13 includes a hopper box formed by a base panel 60, forward and rearward walls 61 and 62 respectively, and end walls 63. The longitudinal depth of hopper box is just sufficient to accommodate the lengths of corn dog sticks 19 which are round sticks having flat ends, as seen in FIG. 12, and which are fabricated from any suitable material such as paper, wood or plastic. Similar to the wiener hopper, the stick hopper includes a plurality of transversely spaced dividers 64 consisting of a base block 65, mounted on the panel 60 and a central agitator 66 which is reciprocated vertically relative to the base block to facilitate the flow of sticks into stick channels between the several dividers. In the down position of the agitators, the agitators seat within the base blocks and the upper surfaces of both parts form a peaked surface to facilitate the flow of sticks into the stick channels.

The agitators 66 are mounted on lifter rods 67 which extend downward through suitable passages in the base blocks 65 and the base panels 60; and these lifter rods are mounted in a pair of transverse support bars 68 and 69. The lifter rods for alternate agitators 66 are supported in one support bar 68; and the lift rods for the intervening agitators are supported in the other lift support bar 69. Separate respective air cylinders 70 and 71 are connected to the support bars 68 and 69; and these air cylinders are connected to a suitable common control to reciprocate the two lift bars and associated structure alternately.

The configuration of this stick hopper 13 and associated agitator mechanism is similar in some respects to a stick hopper described in U.S. Pat. No. 3,961,608 issued Sept. 19, 1972; and this stick hopper and the associated stick inserting mechanism 14 to be described is similar in some respects to a hopper and stick inserting mechanism described in U.S. Pat. No. 4,069,960 issued Jan. 24, 1978.

Figure 14:
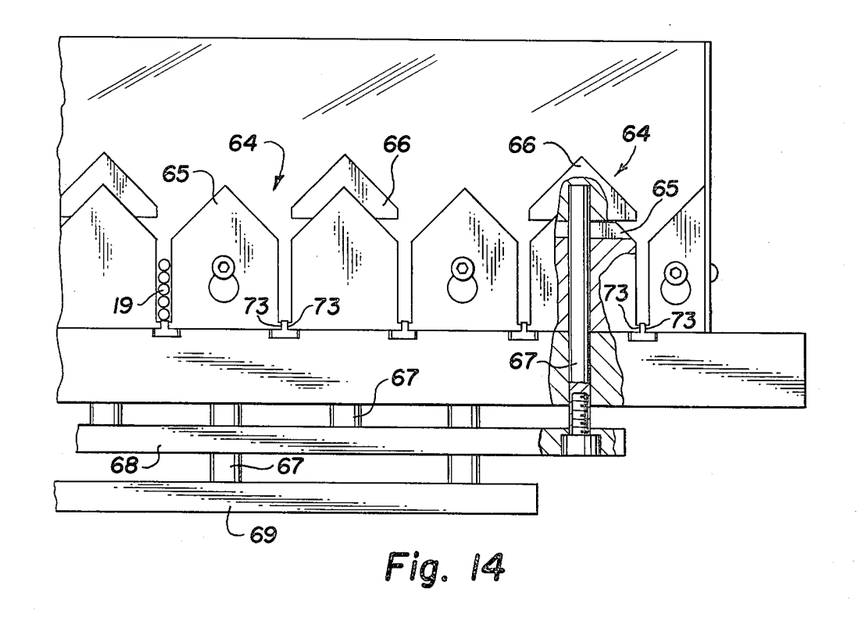
FIG. 14 is a fragmentary front elevation view of the stick hopper showing the action of the ejectors.

As best seen in FIG. 14, the base panel 60 is provided with shallow longitudinal grooves in its upper surface underlying the stick channels between the dividers 64; and the divider blocks 65 are provided with confronting lips 72 at the bases thereof which extend into the stick guide channels and overlie partially the grooves 73. These grooves and lips define a T-shaped channel for stick push rods to be described.

The stick inserting mechanism 14 is similar to that described in above mentioned U.S. Pat. No. 4,069,960, and includes a plurality of longitudinally extending push rods 75 which are carried in an elongated transverse push bar 76. The push bar is mounted for reciprocating movement toward and away from the stick hopper 13 and is guided in this motion on a pair of guide rods 77 suitably supported on the apparatus frame. Similar to the plunger mechanism for the wiener hopper, a stabilizer shaft 78 is rotatably mounted on the push bar 76 by means of bearing blocks 79; and sprockets 80 are nonrotatably mounted at the ends of the stabilizer shaft. These sprockets 80 ride in suitable sprocket guides 81 mounted on the frame to assure that the push rods 75 are reciprocated uniformly relative to the stick hopper. An air cylinder 82 is coupled to the push bar 76 to reciprocate this assembly.

The push rods 75 are T-shaped in cross section, and are inverted in assembly so that the transverse flanges of the push rods ride within the hopper grooves 73 and the vertical flanges of the push rods extend upward between the lips 72, these grooves and lips defining a T-shaped channel for confining the push rods as they move through the stick hopper 13. As seen in drawings, the vertical flanges of the push rods extend above the upper surfaces of the divider lips 72 to engage the end of a stick 19 which has moved downward through the stick channel and is seated on the lips 72.

In the position of the push rod assembly illustrated in FIG. 1, the push rods are withdrawn rearwardly to the extent that the leading ends project only partially through the rearward wall 62; and this allows the sticks in the guide channels to move downward where the lowermost stick is seated on the shoulders defined by the lips 72. When the push rod assembly is then advanced forward, the upper portion of the push rods 75 engage the ends of the respective lowermost sticks 19 and eject these sticks from the stick hopper. With this ejection motion, the plungers extend completely through the stick hopper, so that the trailing ends of the sticks are completely free of the stick hopper and in position to be moved vertically relative to the stick hopper.

Figure 11:
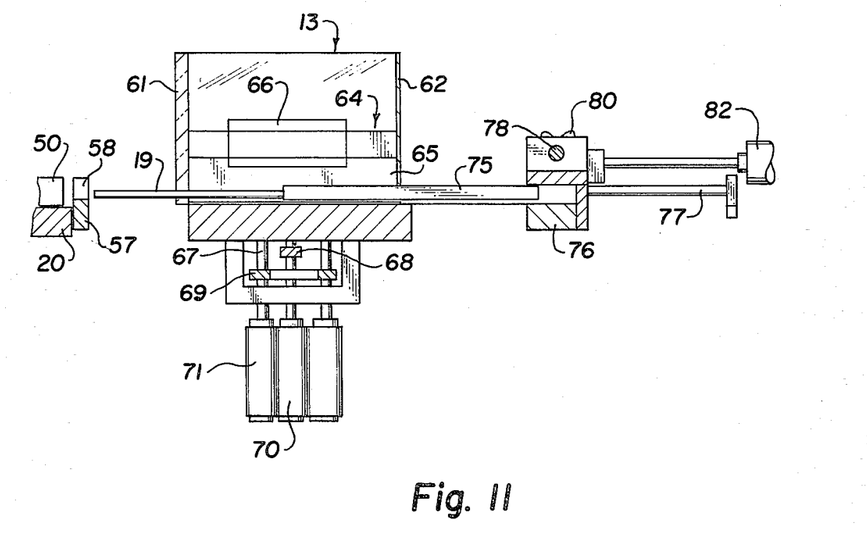
FIG. 11 is a fragmentary longitudinal vertical sectional view, similar to FIG. 10, showing the stick hopper ejection mechanism as partially ejecting sticks toward the weiner clamping assembly.

As best seen in FIG. 11, as the sticks are ejected from the stick hopper, they are guided by their confinement within the guide channels and are projected toward the wiener stop 57 of the wiener clamping assembly. These sticks 19, as ejected from the stick hopper are aligned exactly with the centers of the wiener clamps 50, 51, and with the guide slots 58 in the wiener stop. As mentioned, these apertures 58 are partially bevelled so that, should the leading end of a stick be slightly deflected from the linear path, the guide slot will direct the stick to the center of the wiener 18 confined in the wiener clamp.

The wiener stop 57 of the wiener clamping mechanism is provided to assure that the rearward ends of all of the wieners ejected from the wiener hopper will be disposed in a common transverse plane; and the stick inserting mechanism 14 associated with the stick hopper 13 assures that the lengths of the sticks projecting from the wieners will be identical. When the assembled wieners and sticks are picked up by a suitable transport bar which passes between the stick hopper and the wiener clamping assembly, all of the assembled corn dogs will be uniformly held to assure uniform dipping of the wieners into the corn dog batter and to assure uniform submersion of the corn dogs into a cooking vat for uniform cooking.

STICK FEEDER

Figure 15:
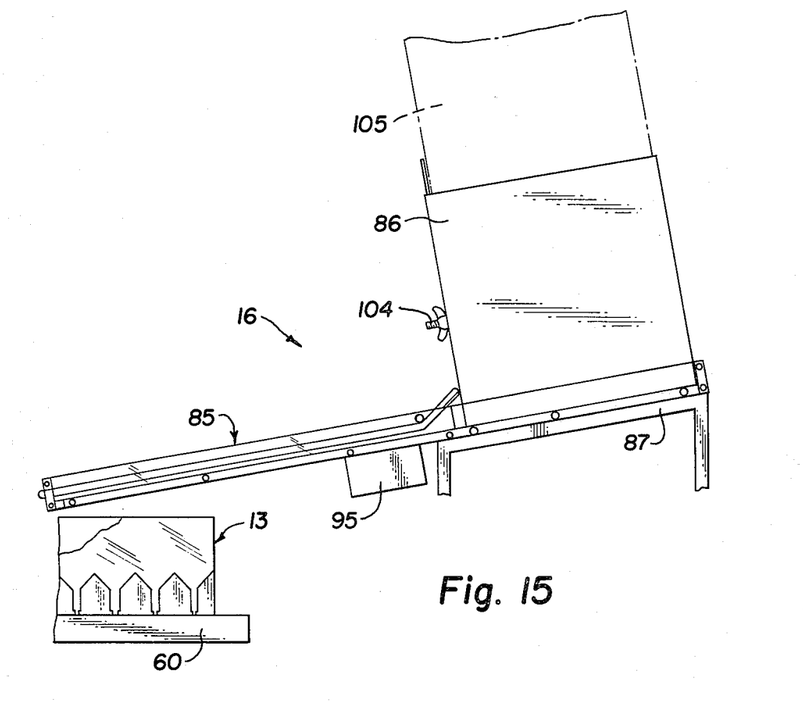
FIG. 15 is a partial elevation view of a stick feeding mechanism associated with the stick hopper.
Figure 16:
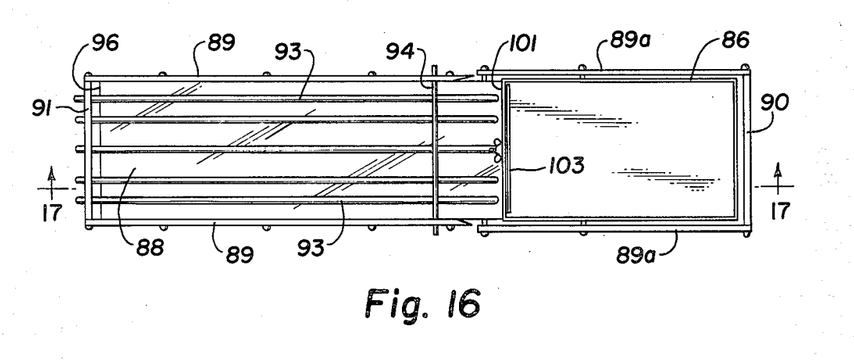
FIG. 16 is a plan view of the stick feeding mechanism of FIG. 15.
Figure 17:
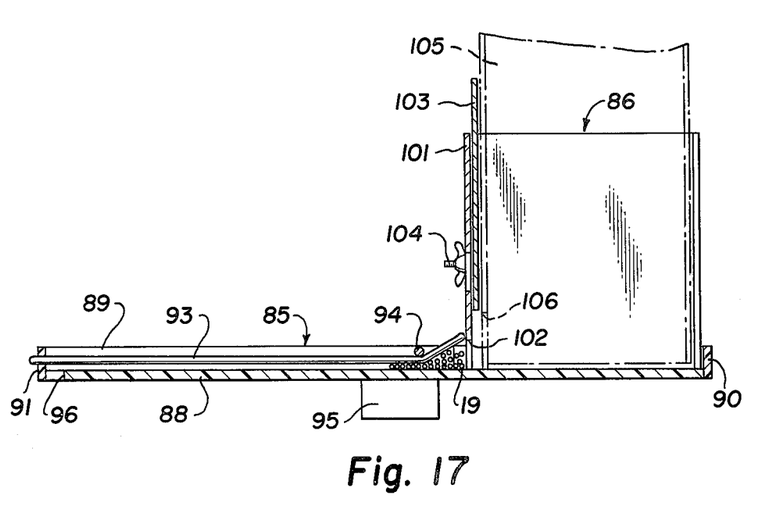
FIG. 17 is a longitudinal sectional view taken along the line 17—17 of FIG. 16.

FIGS. 15, 16 and 17 of the drawing illustrate a stick feeder assembly 16 which may be used in association with the stick hopper 13. As seen in the drawing, the basic components of the assembly are an inclined chute 85 partially overlying the stick hopper 13 and a feed box 86 mounted at one end of the chute. The chute is suitably supported on a portion of the frame 87 for the overall apparatus described.

The chute consists of a base panel 88, side walls 89, a supply end wall 90, and a discharge end wall 91. At the supply end, the chute defines a slot for supporting the feed box 86.

Five separator rods 93 are supported in a plane above and parallel to the surface of the base panel 88 to define a stick channel having a height just sufficient to accommodate a single layer or row of sticks, as best seen in FIG. 17. These separator rods are supported at one end in the discharge end wall 91, and at the other end by a transverse support rod 94 anchored in the side walls 89. The separator rods and support rod may be fabricated from metal with the separator rods welded to the support rod. The support rods are flared upwardly relative to the base panel to define a mouth for the stick channel at the feed end of the channel. A vibrator 95 is mounted underneath the chute, underlying the stick channel mouth, to facilitate the flow of sticks from the mouth into the single layer of the stick channel. A discharge slot 96 is formed in the base panel adjacent to the discharge end wall 91 to allow the sticks to discharge into the stick hopper. The feed box 86 is a rectangular open-topped container dimensioned to receive one end of a shipping carton within which the corn dog sticks 19 are received. A front wall 101 of the container is provided with an elongated transverse slot 102 adjacent to the base to allow the flow of sticks from the feed box. The feed box is supported in the chute contiguous to the stick channel mouth, so that sticks will flow directly from the slot 102 into the stick channel. A vertically sliding gate 103 is associated with the front wall to enable the closing and opening of the slot 102 to control the feed of sticks from the feed box. The vibrator 95 effects the flow of sticks from the feed box 86 into the stick channel mouth, and also effects the flow of sticks through the stick channel to the discharge slot. This gate may be operated by a suitable handle 104 including a threaded shank and an associated wing nut for securing the gate in the desired open or closed position. As best seen in FIG. 17, a carton 105, shown in phantom, may be received and supported within the feed box; and a transverse slot 106 would be cut in the carton for alignment with the feed box slot 102. In this manner, a supply of corn dog sticks are fed to the stick hopper in a most efficient way, utilizing the cartons with which the sticks are received from the supplier. In a relatively long stick hopper, it may be desirable to utilize two stick feeds as described to dispense sticks into the hopper at two points along its length.

The stick feeder as described provides automatic self-control of the supply of sticks from the feed box 85 (or a carton 105 contained therein) into the stick hopper 13. Where the discharge end of the chute 85 is received within the stick hopper 13, as illustrated in FIG. 15, when a pile of sticks has accumulated within the stick hopper to the point where it blocks the further flow of sticks from the chute discharge slot 96, the flow of sticks through the stick channel of the chute 85 will simply stop. Even though the vibrator 95 continues to operate the sticks will not feed until the pile within the hopper 13 moves away from the discharge slot 96. As soon as this pile does move away from the discharge slot, the feed of sticks will automatically resume from the feed box 86 to the discharge slot.

It has been discovered that the described stick feeder assembly 16 will function just as well if it is necessary to provide a curved chute 85.

WIENER FEEDER

Figure 18:
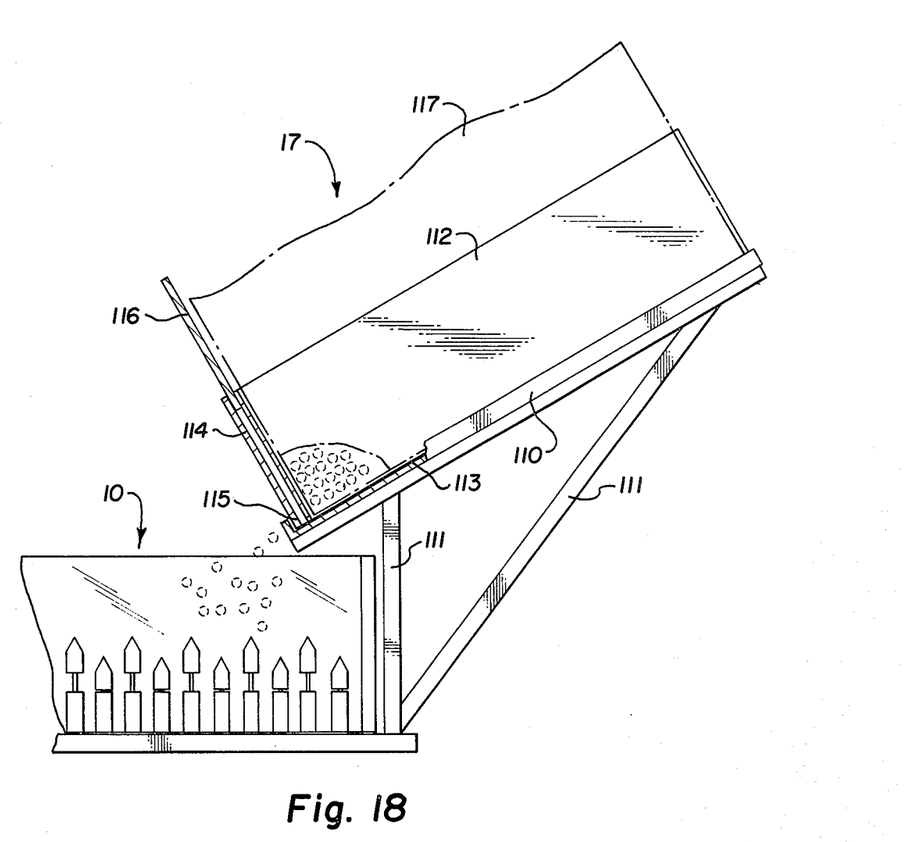
FIG. 18 is a partial elevation view of a wiener feed mechanism associated with the wiener hopper.

FIG. 18 of the drawing illustrates a wiener feeder assembly 17 which may be used in association with the wiener hopper 10. As seen in the drawing, the basic components of the wiener feeder assembly are an inclined base 110 supported on suitable frame supports 111 to partially overlie one end of the wiener hopper 10. The base 110 defines a seat for supporting one of a plurality of feed boxes. The feed box 112 is a rectangular open-topped container dimensioned to receive a shipping carton with which wieners 18 are received. The feed box 112, shown partially in section, includes a floor 113 and a double front wall 114 provided with a discharge slot 115 adjacent to the floor. A sliding door or gate 116 selectively closes and opens the discharge slot 115. A wiener shipping carton 117 (shown fragmentarily in phantom lines) is received the feed box 112; and will have a discharge slot cut away for confronting relation with the discharge slot 115 of the feed box.

Since wieners are bulky items, in a high capacity machine it will be necessary to almost continuously feed wieners from supply cartons into the wiener hopper 10. Accordingly, it would be desirable to have several feed boxes 112 for use with this wiener feed assembly, with which wiener shipping cartons 117 have been preassembled. It will be feasible then when one feed box and shipping carton is exhausted to quickly remove that feed box and replace it with another feed box containing a full supply carton 117. When the feed box is placed on the seat 110 the gate 116 is opened to effect the flow into the hopper.

OPERATION

The operation of the above described apparatus will now be described briefly. The wiener hopper 10 will be loaded with wieners. For a hopper having twenty wiener guide channels, the hopper may contain about six hundred wieners for example. In a high capacity apparatus, the wiener hopper will require loading almost continuously, and this may be facilitated by the use of wiener feeder assemblies 17. Similarly, the stick hopper 13 is loaded with sticks; and this loading may be accomplished automatically through the use of one or more stick feeder assemblies 16. For both the wiener hopper 10 and the stick hopper 13, it is not necessary that the respective wieners and sticks be placed very precisely within the hoppers; that is, the articles need not be placed in a manner that they are precisely oriented with the dividers and guide channels of the respective hoppers. The agitator assemblies which are described for both hoppers will assure that, regardless of the orientation of the articles overlying the dividers and agitator assemblies, the operation of these agitation assemblies will serve to properly orient the articles as they are entering the guide channels and thereby assure the formation of the desired stacks of wieners and sticks in the guide channels of the respective hoppers.

The expelling of the wieners 18 from the wiener hopper 10 into the wiener clamping mechanism 12, and the expelling of the sticks 19 from the stick hopper 13 will be effected on an automatic cycle including the following steps: the plunger mechanism 11 will expel the lowermost wiener from the several wiener guide slots of the wiener hopper into the respective clamps of the clamping mechanism. The wiener stop 57 of the clamping mechanism will stop the movement of the wieners which may be expelled with some force, and also will assure that the leading edges of the expelled wieners are aligned in a common plane. The wiener clamping mechanism is then shifted to the closed position to clamp the wieners; and the stick inserting mechanism 14 associated with the stick hopper 13 will then propel the lowermost sticks in respective stick guide channels of the stick hopper, out of the stick hopper and into the respective wieners clamped in the clamping mechanism. The sticks will be fully ejected from the stick hopper, to enable transverse movement of the assembled sticks and wieners relative to the stick hopper.

In a suitable machine with which the apparatus of the invention is used, a path is provided between the stick hopper and the wiener clamping mechanism for either continuous or intermittent transverse movement of stick transport members 15 shown in phantom in FIG. 1 for clamping the sticks of the assembled wieners and sticks and transporting them for further processing. The clamps of the wiener clamping mechanism will hold the assembled wieners and sticks to enable engagement of the sticks by the transport devices; and the clamps may be opened with suitable timing to release the assemblies for movement with the transport members.

The agitators of the wiener hopper and stick hopper will assure continuous flow of wieners and sticks into the several vertical guide channels.

What has been described is a novel apparatus which is particularly adapted for the automatic feeding and assembling of wieners and holder sticks to form a corn dog product, and which may be utilized for the feeding and assembling of components and products having similar characteristics. Principal features and advantages of the invention are: that wieners are fed automatically from a common hopper box into separate guide channels accommodating vertical stacks of single wieners, with the lowermost wiener of the stack positioned to be ejected from the hopper; that the flow of wieners into the several guide channels is assured by a suitable agitator mechanism; that the lowermost wieners in the several guide channels are expelled simultaneously and aligned transversely in associated wiener clamps; that the wieners are clamped in wiener clamps in a common horizontal plane; that a supply of sticks in a common stick hopper are fed into respective guide channels containing vertical stacks of a single row of sticks, with the lowermost stick in the guide channels positioned to be expelled from the wiener hopper; that the sticks are expelled simultaneously from the several guide channels in alignment with the wiener clamping chambers of the wiener clamping assembly, and are inserted forcibly into the wieners; and that the assembled wieners and sticks are then held for engagement of the sticks by an appropriate transport member, with the clamps releasing the wieners on appropriate timing to permit the transport of the assembled wieners and sticks from the apparatus for further processing. The apparatus enables the fabrication of a machine for complete processing of corn dogs, including application of batter to the corn dogs and cooking of the corn dogs, all in a high capacity machine. Another feature and advantage of the apparatus is the provision of a stick feeding mechanism for semi-automatically feeding a supply of sticks into the stick hopper.

Another feature and advantage of the invention is the relative simplicity of design, enabling the manufacture of apparatus which is durable and reliable.

While the preferred embodiment of the invention has been illustrated and described, it will be understood by those skilled in the art that changes and modifications may be resorted to without departing from the spirit and scope of the invention.

What is claimed is:

1. Apparatus for feeding and assembling elongated components of articles comprising
   a first hopper for containing a plurality of first components; said hopper having a floor and means for directing said components in parallel, generally vertical, single row stacks on said floor;
   means for expelling the lowermost component longitudinally from each stack means, comprising a plurality of plungers disposed for reciprocating movement in alignment with said stack means; and means for reciprocating said plungers relative to said stack means;
   clamp means disposed adjacent to said first hopper comprising a plurality of pairs of first and second clamp halves, each pair defining a clamping chamber aligned with a respective stack means; means for closing and opening said clamp halves to clamp and release respective first components;
   a second hopper for containing a plurality of second components; said second hopper having a floor and means for directing said second components in parallel, generally vertical, single row stacks on said floor;
   means for expelling the lowermost second component longitudinally from each stack means of said second hopper, comprising a plurality of push rods disposed for reciprocating movement in alignment with said stack means; means for reciprocating said push rods to push said second components from respective stack means into respective clamping chambers, and into first components clamped therein.

2. Apparatus as set forth in claim 1
   said means in said first hopper for directing said first components comprising a plurality of transversely spaced dividers mounted on said floor, defining transversely spaced longitudinal guide channels; each guide channel being dimensioned to receive a single vertical stack of said first components.

3. Apparatus as set forth in claim 2
   a plurality of spacers selectively mounted on the faces of said dividers defining said guide channels, to accommodate said guide channels to components of smaller size.

4. Apparatus as set forth in claim 2
   certain of said dividers comprising a lower base member and an upper agitator member; said upper agitator members being reciprocable vertically relative to respective base members to assist in directing components into respective guide channels;

said agitators being provided on at least alternate dividers of said hopper.

5. Apparatus as set forth in claim 4
said agitator members having thin walled skirts extending downwardly therefrom and overlying said base members, defining continuations of the divider walls.

6. Apparatus as set forth in claim 2
each of said dividers comprising a lower base member and an upper agitator member reciprocable vertically relative to said base member;
said agitator members being mounted on lift rods extending vertically through respective base members;
said lift rods for said agitators of alternate dividers being mounted on a first common support member and said lift rods for the agitators of intervening dividers being mounted on a second common support member; and means for reciprocating said first and second support members alternately, whereby the agitators defining confronting faces of each respective guide channel are lifted alternately.

7. Apparatus as set forth in claim 1
said clamp halves being supported on a floor coplanar with the floor of said first hopper;
said clamp halves for each clamp member having confronting concave faces formed relative to a longitudinal axis aligned with respective stack means and spaced from said floor.

8. Apparatus as set forth in claim 7
a transverse limit wall disposed adjacent to said clamp means opposite from said first hopper; said limit wall defining a longitudinal limit of said clamping chambers;
said limit wall having guide apertures for said second components aligned with said longitudinal axes of respective clamping chambers.

9. Apparatus as set forth in claim 1
said clamp halves being supported on a base panel having transverse slots therein, and each clamp halve including vertical guide pins extending downwardly through respective slots of said panel;
first and second elongated motion bars disposed transversely under said base panel for relative reciprocating movement;
said guide pins of said first clamp halves being supported in said first motion bar, and said guide pins of said second clamp halves being supported in said second motion bar; and means for reciprocating said first and second motion bars in opposite directions to effect the closing and opening of said clamp halves.

10. Apparatus as set forth in claim 1
said means in said second hopper for directing said second components comprising a plurality of transversely spaced dividers mounted on said floor, defining transversely spaced longitudinal guide channels; each guide channel being dimensioned to receive a single vertical stack of said second components.

11. Apparatus as set forth in claim 10
certain of said dividers comprising a lower base member and an upper agitator member; said upper agitator members being reciprocable vertically relative to respective base members to assist in directing components into respective guide channels;
said agitators being provided on at least alternate dividers of said second hopper.

12. Apparatus as set forth in claim 10
each of said dividers comprising a lower base member and an upper agitator member reciprocable vertically relative to said base member;
said agitator members being mounted on lift rods extending vertically through respective base members;
said lift rods for said agitator members of alternate dividers being mounted on a first common support member, and said lift rods for said agitator members of intervening dividers being mounted on a second common support member; and means for reciprocating said first and second support members alternately, whereby the agitator members defining confronting faces of each respective guide channel are lifted alternately.

13. Apparatus as set forth in claim 1
said second hopper being configured to receive second components having the shape of elongated sticks;
a feeding mechanism for feeding sticks to said second hopper comprising an elongated chute having a supply end and a discharge end;
means for supporting said chute in inclined relation to said second hopper, with its discharge end overlying said hopper; said discharge end having an elongated discharge slot for dropping parallel oriented sticks into said hopper;
said chute having guide channel means for guiding a single horizontal row of sticks to said discharge end, said guide channel means having a diverging mouth;
said chute having means defining a supply station at its supply end;
said supply station having means for supporting a supply carton of sticks, whereby sticks may be discharged from said supply carton directly into said guide channel mouth;
and vibrator means mounted on said chute for agitating the sticks in said guide channel mouth to facilitate the feeding thereof into said guide channel.

14. Apparatus as set forth in claim 13
said chute comprising an elongated trough having a planar floor; a plurality of elongated rods mounted in spaced relation overlying said floor defining said guide channel means, said rods being flared away from said floor to define said mouth.

15. Apparatus as set forth in claim 13
said supply station comprising an open topped box for receiving a supply of sticks; said box having an elongated discharge opening adjacent to its base, disposed in confronting relation with said guide channel mouth; said box having
gate means for closing and opening said discharge opening;
and said box being configured to receive and support a shipping container of said sticks.

16. Apparatus as set forth in claim 1
said first hopper being configured to receive first components configured as elongated bulky articles;
a feeding mechanism for feeding said articles to said first hopper comprising an inclined support base for supporting a container of said articles, partially overlying said hopper; said support base being adapted to support the base of said container, with said container having a discharge opening provided in its wall at the lower end of said support base and adjacent to the container base, whereby said articles flow directly from said container into said first hopper.

17. Apparatus as set forth in claim 16
said feeding mechanism including an open-topped feed box configured to seat on said support base and to receive said container; said feed box having a discharge opening in one wall adjacent to its base, to be disposed at the lower end of said support base overlying said first hopper; and gate means for closing and opening said discharge opening to control the flow of articles from a container received in said feed box.

18. Apparatus for handling elongated articles comprising
a hopper for containing a plurality of articles, having a support floor; a plurality of spaced dividers mounted on said floor, defining spaced side-by-side guide channels, each channel being dimensioned to receive a single vertical stack of articles; each of said dividers comprising a lower base member and an upper agitator member reciprocable vertically relative to said base member;
said agitator members being mounted on lift rods extending vertically through respective base members;
said lift rods for said agitators of alternate dividers being mounted on a first common support member, and said lift rods for the agitators of intervening dividers being mounted on a second common support member; and means for reciprocating said first and second support members alternately, whereby the agitators defining confronting faces of each respective guide channel are lifted alternately;
a plurality of spacers selectively mounted on the faces of said divider base members defining said guide channels, to accommodate said guide channels to articles of smaller size.

19. Apparatus as set forth in claim 18
said agitator members having thin walled skirts extending downwardly therefrom and overlying said base members, defining continuations of the guide channel walls; said spacers underlying said skirts.

20. Apparatus for handling elongated articles comprising
a hopper for containing a plurality of components, having a support floor; a plurality of transversely spaced dividers mounted on said floor, defining transversely spaced longitudinal guide channels, each channel being dimensioned to receive a single vertical stack of articles; each of said dividers comprising a lower base member and an upper agitator member reciprocable vertically relative to said base member;
said agitator members being mounted on lift rods extending vertically through respective base members;
said lift rods for said agitators of alternate dividers being mounted on a first common support member, and said lift rods for the agitators of intervening dividers being mounted on a second common support member; and means for reciprocating said first and second support members alternately, whereby the agitators defining confronting faces of each respective guide channel are lifted alternately;
means for expelling the lowermost article longitudinally from each guide channel, comprising a plurality of plungers disposed for reciprocating movement in alignment with said guide channels, and means for reciprocating said plungers into and out of said hopper;
clamp means disposed adjacent to said hopper comprising a plurality of first and second clamp halves, each defining a clamping chamber aligned with a respective hopper guide channel; means for closing and opening said clamp halves to clamp and release respective articles;
said clamp halves being supported on a base panel having transverse slots therein, and each clamp halve including vertical guide pins extending downwardly through respective slots in said panel;
first and second elongated motion bars disposed transversely under said base panel for relative reciprocating movement; said guide pins of said first clamp halves being supported in a first motion bar, said guide pins of said second clamp halves being supported in a second motion bar; and means for reciprocating said first and second motion bars in opposite directions to effect the closing and opening of said clamp halves.

21. Apparatus for feeding elongated components comprising
a hopper for containing a plurality of components; said hopper having a floor and stack means for directing said components in parallel, generally vertical, single row stacks on said floor;
means for expelling the lowermost components longitudinally from each stack means, comprising a plurality of plungers disposed for reciprocating movement in alignment with said stack means; and means for reciprocating said plungers relative to said stack means;
clamp means disposed adjacent to said hopper comprising a plurality of pairs of first and second clamp halves said clamp halves being supported on a floor coplanar with the floor of said hopper; each pair defining a clamping chamber aligned with a respective stack means; said clamp halves of respective pairs being reciprocable relative to each other in planes parallel with that of said hopper floor, to open and close respective clamping chambers to receive, clamp, and release components expelled from said hopper.

22. Apparatus as set forth in claim 21
means for closing and opening said clamp halves to clamp and release respective components; said means for closing said clamp halves being responsive to the completion of the expelling movement of said plungers.

23. Apparatus as set forth in claim 21
said clamp halves of each pair having confronting concave faces formed to define an elongated clamping chamber aligned with respective stack means and spaced from said floor of said clamp means.

24. Apparatus as set forth in claim 21
a transverse limit wall disposed adjacent to said clamp means opposite from said hopper; said limit wall defining a longitudinal limit of said clamping chambers.

25. Apparatus as set forth in claim 21
said hopper being configured to receive components configured as elongated bulky articles;
a feeding mechanism for feeding said articles to said hopper comprising an inclined support base for supporting a container of said articles, partially overlying said hopper; said support base being adapted to support the base of said container, with said container having a discharge opening provided in its wall at the lower end of said support base and adjacent to the container base, whereby said articles flow directly from said container into said hopper.

26. Apparatus as set forth in claim 25 said feeding mechanism including an open-topped feed box configured to seat on said support base and to receive said container; said feed box having a discharge opening in one wall adjacent to its base, to be disposed at the lower end of said support base overlying said hopper; and gate means for closing and opening said discharge opening to control the flow of articles from a container received in said feed box.

* * * * *